United States Patent [19]

Hoshino

[11] Patent Number: 5,586,478
[45] Date of Patent: Dec. 24, 1996

[54] CENTERING DEVICE HAVING WORK REST CONTROL RESPONSIVE TO CARRIAGE MOVEMENT

[75] Inventor: Teruo Hoshino, Gifu-ken, Japan

[73] Assignee: Dainichi Kinzoku Kogyo Co., Ltd., Osaki, Japan

[21] Appl. No.: 618,565

[22] Filed: Mar. 20, 1996

Related U.S. Application Data

[62] Division of Ser. No. 237,149, May 3, 1994, Pat. No. 5,517,886.

[51] Int. Cl.⁶ .............................. B23B 31/00; B23Q 7/00; B23Q 3/16
[52] U.S. Cl. .................................. 82/133; 82/154; 82/162
[58] Field of Search ............................. 82/118, 121, 133, 82/153, 154, 162–164, 170; 142/48, 49; 451/29, 408; 29/27 R; 409/73

[56] References Cited

U.S. PATENT DOCUMENTS

| | | | |
|---|---|---|---|
| 2,368,408 | 1/1945 | Brooking | 82/154 |
| 2,615,373 | 10/1952 | Pegard | 82/153 |
| 3,782,228 | 1/1974 | Lindemann et al. | 82/130 |
| 4,215,605 | 8/1980 | Blaimschein | 82/19 |
| 4,754,673 | 7/1988 | Hestand | 82/162 |
| 5,014,580 | 5/1991 | Porter | 82/164 |

*Primary Examiner*—M. Rachuba
*Assistant Examiner*—Kenneth J. Hansen
*Attorney, Agent, or Firm*—Dennison, Meserole, Pollack & Scheiner

[57] ABSTRACT

A centering device for use with a lathe having a bed, a head and tail stock for holding a work therebetween, a carriage reciprocally movable by a drive motor and a tool box includes a plurality of work rests disposed along the longitudinal direction of the lathe bed. Each of the work rests is movable between a first position for supporting the work and a second position spaced from the work. A control device is associated with the work rests for controlling movement of each of the work rests between the first position and the second position in response to the movement of the carriage and the control device operates to stop carriage movement so as to prevent collision with a work rest.

8 Claims, 13 Drawing Sheets

5,586,478

CENTERING DEVICE HAVING WORK REST CONTROL RESPONSIVE TO CARRIAGE MOVEMENT

This is a divisional of application Ser. No. 08/237,149, filed May 3, 1994, now U.S. Pat. No. 5,517,886, which issued on May 21, 1996.

BACKGROUND OF THE INVENTION

1. Field of the Invention

The present invention relates to a centering device which is used with a lathe and which is particularly suitable to center a long work to be threaded.

2. Description of the Prior Art

Referring to FIG. 19, there is shown a conventional centering device including a plurality of work rests R (only one is shown in FIG. 19) mounted on a bed B and spaced from each other by a predetermined distance for supporting a long round bar or a work W to be threaded. Each of the work rests R is constructed as a manually operable jack and is adjustable in its height so as to center the work W which is clamped by a traveling stay (not shown) mounted on a carriage (not shown).

However, such a thread cutting operation requires several ten times (for example, twenty times for a P-6 thread) of reciprocal movements of the carriage, so that the operation for moving the position of the work rests R or the operation for mounting and removing the same must be frequently performed. Therefore, the conventional centering device involves the problem that the operation is very troublesome. Further, although the feeding speed of the carriage has now been increased by use of a cutting tool made of cemented carbide in place of one made of high speed tool steel, the thread cutting operation cannot be efficiently performed because of the above troublesome operation.

SUMMARY OF THE INVENTION

It is, accordingly, an object of the present invention to provide a centering device which is operable to effectively support a work in response to various machining operations of a lathe.

According to the present invention, there is provided a centering device for use with a lathe having a bed, a head stock and a tail stock for supporting a work therebetween, a carriage reciprocally movable in a longitudinal direction of the bed, and a tool box having a cutting tool mounted thereon, comprising:

- a plurality of work rests disposed along the longitudinal direction of the bed, each of the work rests being movable between a first position for supporting the work and a second position spaced from the work; and
- a control device associated with the work rests for controlling movement of each of the work rests between the first position and the second position in response to the movement of the carriage.

The invention will become more fully apparent from the claims and the description as it proceeds in connection with the drawings.

DETAILED DESCRIPTION OF THE PREFERRED EMBODIMENT

Figure 1:
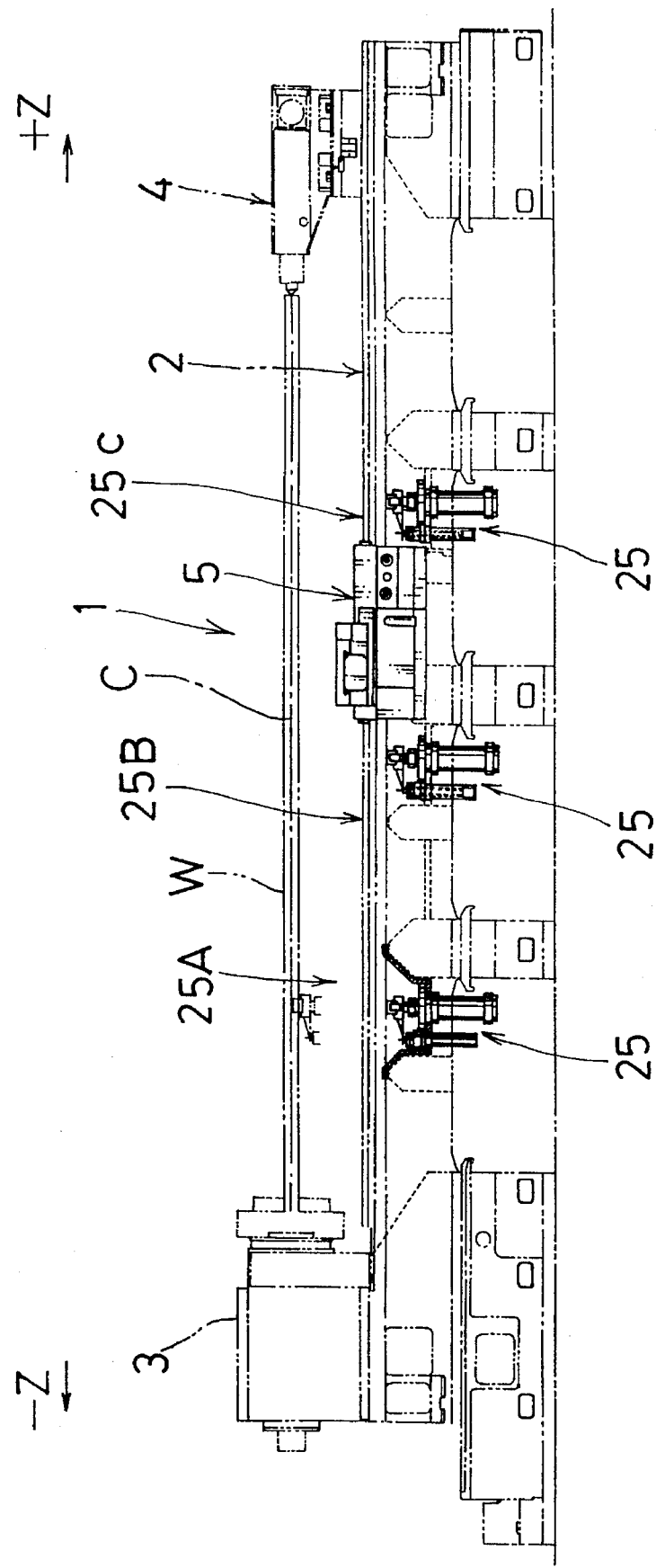
FIG. 1 is a schematic front view of a centering device, incorporated into a lathe, according to an embodiment of the present invention.

Referring to FIG. 1, there is shown a bed 2 of a lathe 1 in schematic front view. The lathe 1 includes a head stock 3 mounted on the bed 2 on the left side of FIG. 1, a tail stock 4 slidably mounted on the bed 2 on the side opposite to the head stock 3, and a carriage 5 disposed between the head stock 1 and the tail stock 4 for reciprocal movement therebetween. The carriage 5 includes a traveling stay 6 shown in FIG. 2. A tool box 7 is movable in a direction perpendicular to the direction of movement of the carriage 5.

Figure 2:
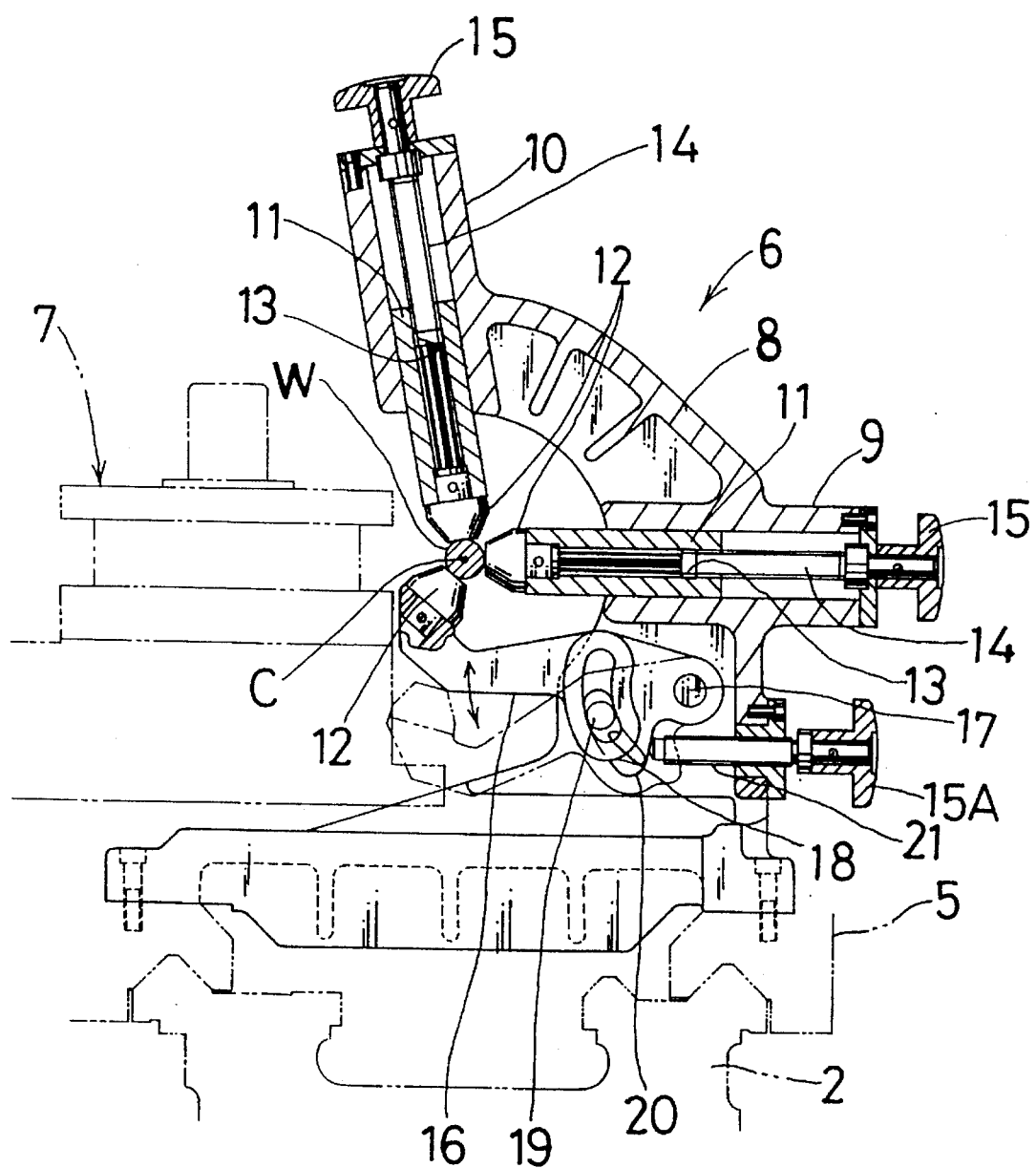
FIG. 2 is a sectional view of a clamp device of the lathe.

As shown in FIG. 2, the traveling stay 6 includes three centering fingers 12 each oriented in a direction toward a central line C which connects a center of the head stock 3 to a center of the tall stock 4 and which coincides with a central line of a work W (a long round bar in this embodiment). A frame 8 having a substantially arcuate configuration includes a lower cylindrical portion 9 and an upper cylindrical portion 10 each formed integrally with the frame 8. The lower cylindrical portion 9 extends in a horizontal direction toward the central line C. The upper cylindrical portion 10 is disposed upwardly forward of the lower cylindrical portion 9 and is inclined relative to the lower cylindrical portion 9 by a predetermined angle. As with the lower cylindrical portion 9, the upper cylindrical portion 10 extends toward the central line C. A cylindrical slider 11 is slidably inserted into each of the upper and lower cylindrical portions 9 and 10 and has an outer end on which a corresponding one of the centering fingers 12 is fixedly mounted. The cylindrical slider 11 includes a threaded inner wall in engagement with an adjustable screw rod 14 having a handle 15, so that its corresponding centering finger 12 can be moved away and toward the central line C by turning the handle 15. The remaining one of the centering fingers 12 is fixedly mounted on one end of a link arm 16 which is pivotally mounted on the frame 8 at a position downwardly of the lower cylindrical portion 9 through a pivot pin 17. The link arm 16 includes a positioning slot 18 which has an arcuate configuration and has a predetermined radius around the pivot pin 17. A fixing screw 19 is inserted through the slot 9 and is screwed into a part the frame 8. An adjusting screw rod 21 having a handle 15A is threadably engaged with a corresponding threaded hole formed on the frame 8 and extends in the horizontal direction toward a lug 20 formed on the link arm 16, so that the link arm 16 is pivoted around the pivot pin 17 to move its centering finger 12 toward the central line C as the handle 15A is turned to move the screw rod 21 toward the lug 20. The traveling stay 6 thus constructed is operated to clamp the work W held between the center of the head stock 3 and the center of the tail stock 4, at three points within a vertical plane, while it is traveling together with the carriage 5.

A plurality of work rests 25 (three in this embodiment) are disposed on the bed 2 on which the carriage 5 having the traveling stay 6 as described above is slidably mounted. The work rests 25 are spaced from each other by a predetermined distance in the longitudinal direction of the bed 2. The construction of the work rests 25 will now be described with reference to FIGS. 3 to 9. Each of the work rests 25 has the same construction, and therefore, the explanation will be made to only one work rest 25.

The work rest 25 includes a telescopic operational cylinder 26 having a piston rod 27 (see FIG. 3), a bidirectional rotation prevention device 36 (see FIGS. 4 to 7) for preventing rotation of the piston rod 27, and a speed reduction device 50 (see FIGS. 8 and 9) for the piston rod 27.

Figure 3:
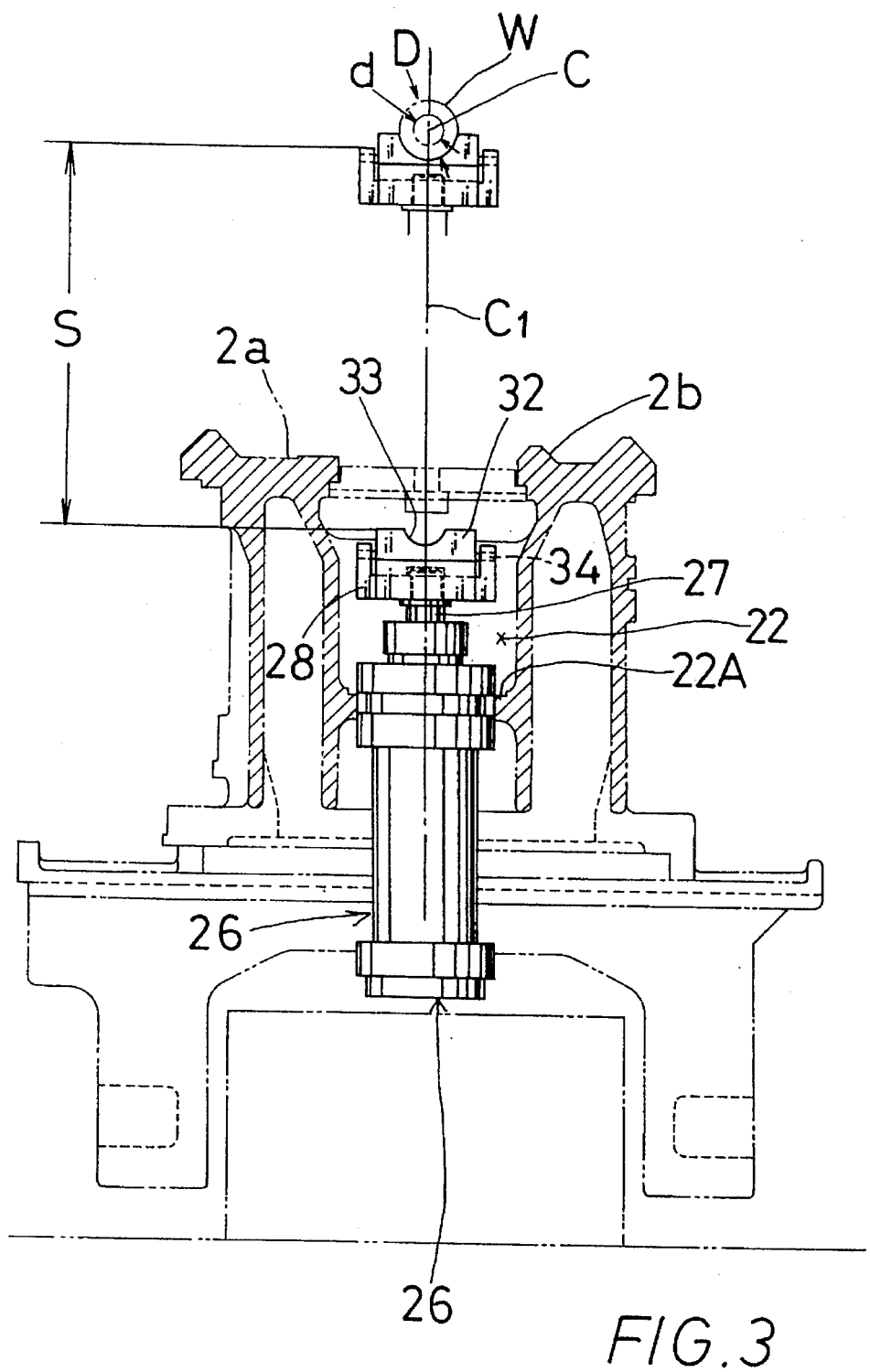
FIG. 3 is a side view of a work rest, with the lathe shown in vertical sectional view.
Figure 4:
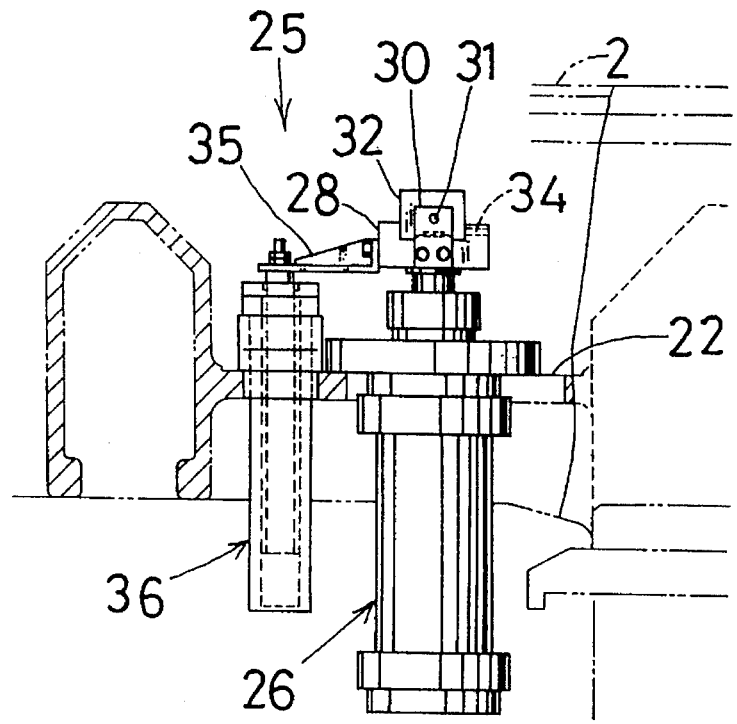
FIG. 4 is a front view of the work rest.
Figure 5:
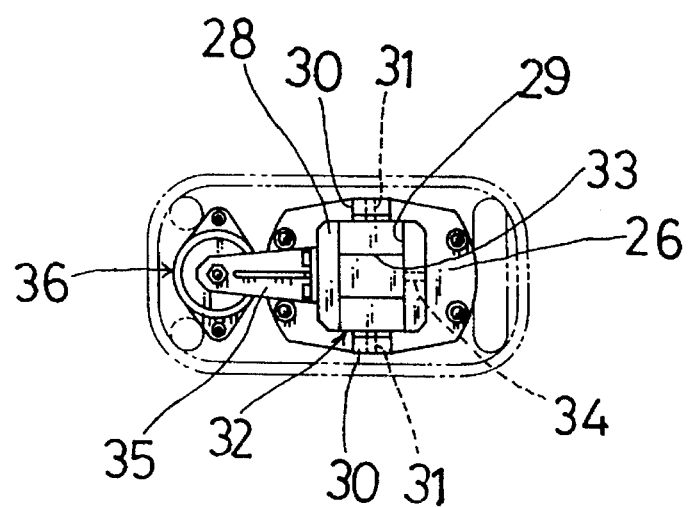
FIG. 5 is a plan view of the work rest.
Figure 6:
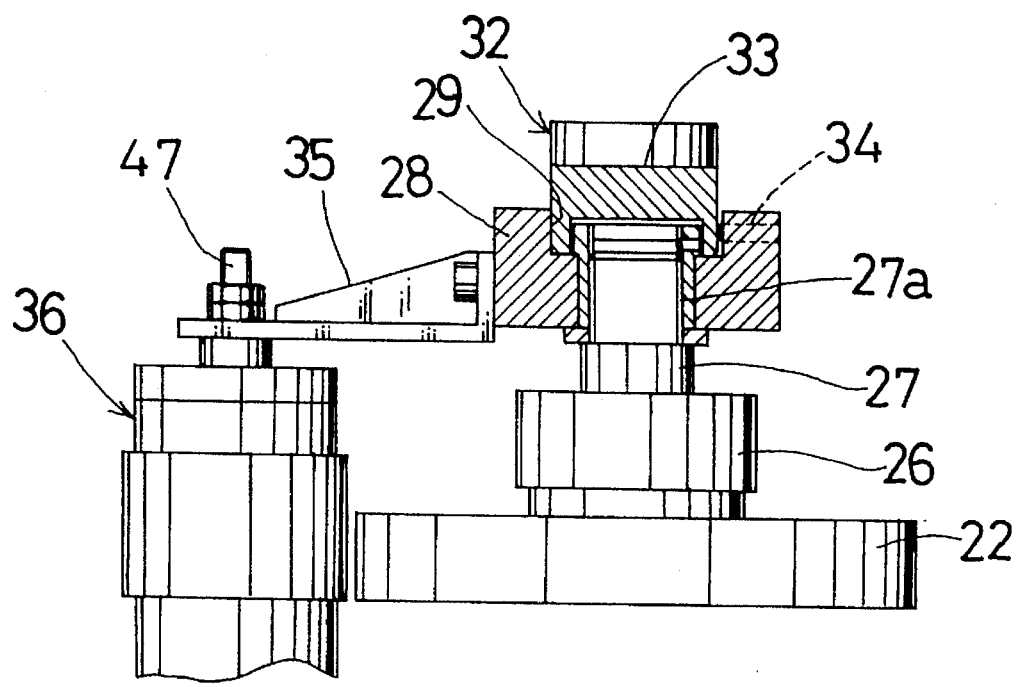
FIG. 6 is an enlarged view of the essential parts of FIG. 4 showing the relationship between the work rest and a bidirectional rotation prevention device associated therewith.

As shown in FIG. 3, the operational cylinder 26 is mounted on a bottom 22A of a valley 22 formed between a left and a right guide surface 2a and 2b of the bed 2 and extends downwardly through the bottom 22A. The operational cylinder 26 is positioned such that its longitudinal axis or its central line C1 extends in a vertical direction or a direction perpendicular to the central line C. The piston rod 27 of the operational cylinder 26 is movable within a stroke S. As shown in FIG. 6, the piston rod 27 has a threaded portion 27a at its upper end for mounting thereon a head-mounting bracket 28. The head-mounting bracket 28 has a recess 29 for fitting a head metal 32 therein. As shown in FIGS. 4 and 5, a pair of positioning blocks 30 are mounted on the bracket 28 at positions on both sides of the recess 29. Each of the positioning blocks 30 is adjustable in its position by an adjusting screw 31. The head metal 32 has a block-like configuration corresponding to the configuration of the recess 29. As shown in FIGS. 3 and 6, the head metal 32 includes a recess 33 formed on the central portion of an upper surface thereof and having an arcuate configuration in section. The recess 33 serves to receive the lower portion of the work W, and therefore, according to the diameter of the work W, the head metal 32 is appropriately selected from a plurality having various radius of curvature such as between a smallest radius d and a largest radius D. The head metal 32 is fitted into the recess 29 of the head-mounting bracket 28 with the recess 33 oriented in the same direction as the central line C. Then, the adjusting screws 31 are driven to position the head metal 32 such that the center of the recess 33 is brought into alignment with the central line C. The head metal 32 is fixed in position by a lock screw 34 (see FIGS. 3 to 6) which is in engagement with one of the side walls of bracket 28 forming the recess 29. A rotation prevention bracket 35 is mounted on the other of the side walls of the bracket 28 and is connected to the bidirectional rotation prevention device 36.

Figure 7:
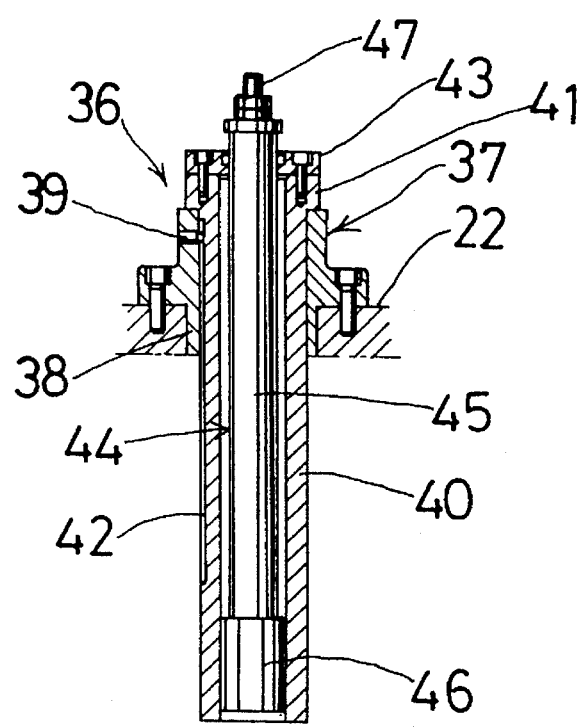
FIG. 7 is a vertical sectional view of the bidirectional rotation prevention device.

The bidirectional rotation prevention device 36 is mounted on the bottom 22A of the valley 22 of the bed 2 in juxtaposed relationship with its corresponding operational cylinder 26. As shown in FIG. 7, the bidirectional rotation prevention device 36 includes an annular mounting flange 37, a first shaft 44, and a cylindrical second shaft 45 for slidably receiving the first shaft 44. The mounting flange 37 has a cylindrical portion 38 which is mounted on the bottom 22A of the valley 22 and extends therethrough. A guide screw 39 is screwed on the upper part of the cylindrical portion 38 and has one end which extends inwardly thereof. The second shaft 45 is slidably received within the mounting flange 37 and has a flange portion 41 on its upper end for abutment on the upper end of the mounting flange 37. A guide recess 42 is formed on the outer surface of the second shaft 40 and extends in the longitudinal direction of the second shaft 40. One end of the guide screw 39 serves to engage the guide recess 42 so as to prevent rotation of the second shaft 40 relative to the mounting flange 37 and so as to provide a linear guide of the second shaft 40. An upper lid 43 having an insertion hole of the first shaft 44 is mounted on the flange portion 41 of the second shaft 40. The first shaft 44 includes a smaller diameter portion 45 adapted to be inserted into the upper lid 43 and having a predetermined length, a larger diameter portion 46 formed on the lower end of the smaller diameter portion 45 and adapted to slidably contact an inner surface of the second shaft 40, and a threaded portion 47 formed on the upper end of the first shaft 44 for connection with the rotation prevention bracket 35.

With the bidirectional rotation prevention device 36 thus constructed, as the operational cylinder 26 is operated to extend the piston rod 27 upwardly, the first shaft 44 is moved upwardly via the rotation prevention bracket 35, so that the larger diameter portion 46 formed on the lower end of the first shaft 44 abuts on the upper lid 43 of the second shaft 40 and engages the same. Then, the second shaft 40 is moved linearly upward together with the first shaft 44 under the guide of the guide screw 39 which is in engagement with the guide recess 42, resulting in that the piston rod 27 is prevented from rotation relative to the cylinder 26 so as to reliably fix the head metal 32 which has the recess 33 for receiving the work W as described above. In order to reduce an impact force which may be applied from the head metal 32 to the work W when the piston rod 27 is extended to support the work W, a speed reduction device 50 is interposed between the bidirectional rotation preventing device and the bed 2 so as to reduce the impact force.

Figure 8:
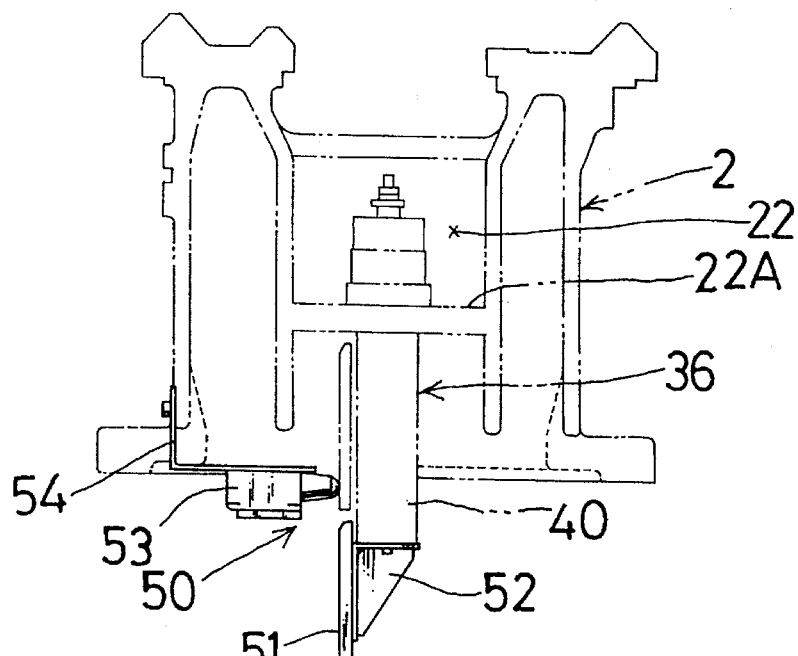
FIG. 8 is a side view of a speed reduction device associated with the work rest.
Figure 9:
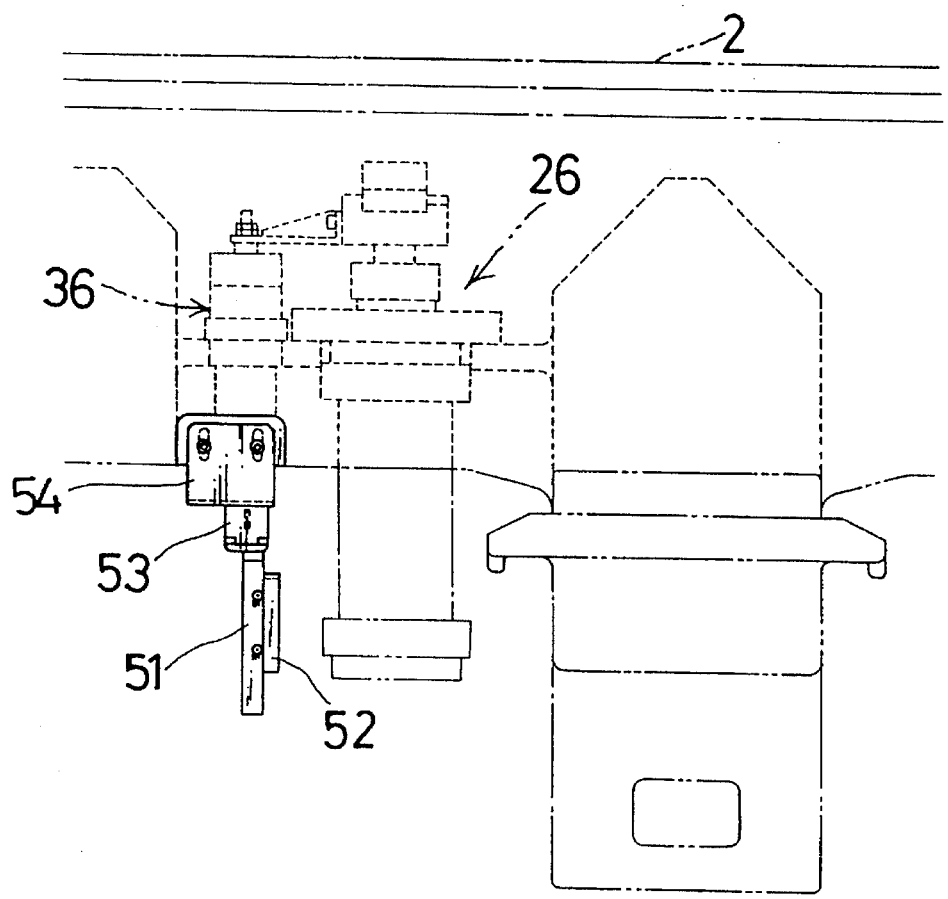
FIG. 9 is a front view of FIG. 8.
Figure 10:
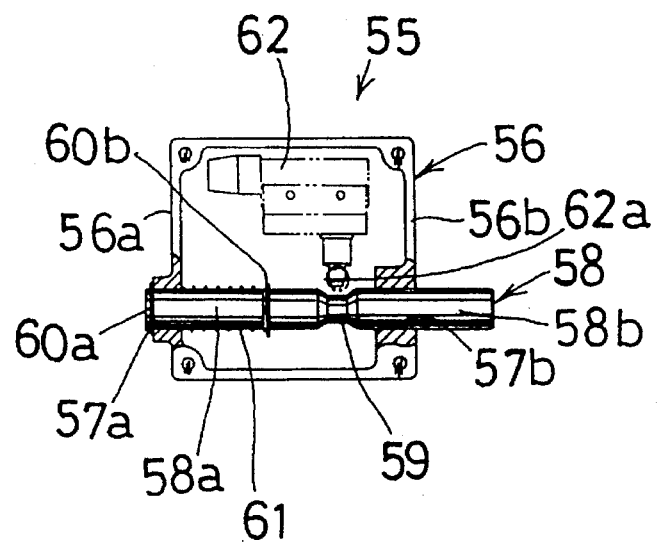
FIG. 10 is a sectional plan view of one of collision prevention devices mounted on a carriage of the lathe.

As shown in FIGS. 8 and 9, the speed reduction device 50 includes a bar-like dog 51 and a limit switch 53. The dog 51 is mounted on the lower end of the second shaft 40 of the rotation prevention device 36 by means of a dog mounting bracket 52. The limit switch 53 is mounted on the bed 2 by means of a limit switch mounting bracket 54 and is positioned within a path through which the dog 51 is permitted to travel. The dog 51 has a substantially square configuration in section and is positioned such that its upper end is spaced from the limit switch 53 by a predetermined distance when the piston rod 27 of the operational cylinder 26 is retracted or the second shaft 40 of the rotation prevention device 36 is positioned at its lowermost position. The limit switch 53 is electrically connected to a magnetic flow control valve (not shown) which is provided in a hydraulic channel connected to a piston chamber (not shown) of the operational cylinder 26.

The operation of the speed reduction device 50 will now be explained. As described above, when the piston rod 27 of the operational cylinder 26 is extended to move the first shaft 44 of the rotation prevention device 36 upwardly through the bracket 35, the second shaft 40 is moved upwardly together with the first shaft 44 through abutment of the larger diameter portion 46 on the upper lid 43 of the second shaft 40. As the second shaft 40 is thus moved upwardly, the dog 51 mounted on the second shaft 40 is brought into contact with the limit switch 53 which is positioned on the traveling path of the dog 51, so that a contact signal is produced and is supplied to the magnetic flow control valve provided in the hydraulic channel. Then, the magnetic flow control valve is operated to reduce the amount of the hydraulic fluid to be supplied to the piston chamber of the operational cylinder 26. The speed of the upward movement of the piston rod 27 is therefore reduced so as to permit the head metal 32 to gently abut on the work W for supporting the same.

Figure 11:
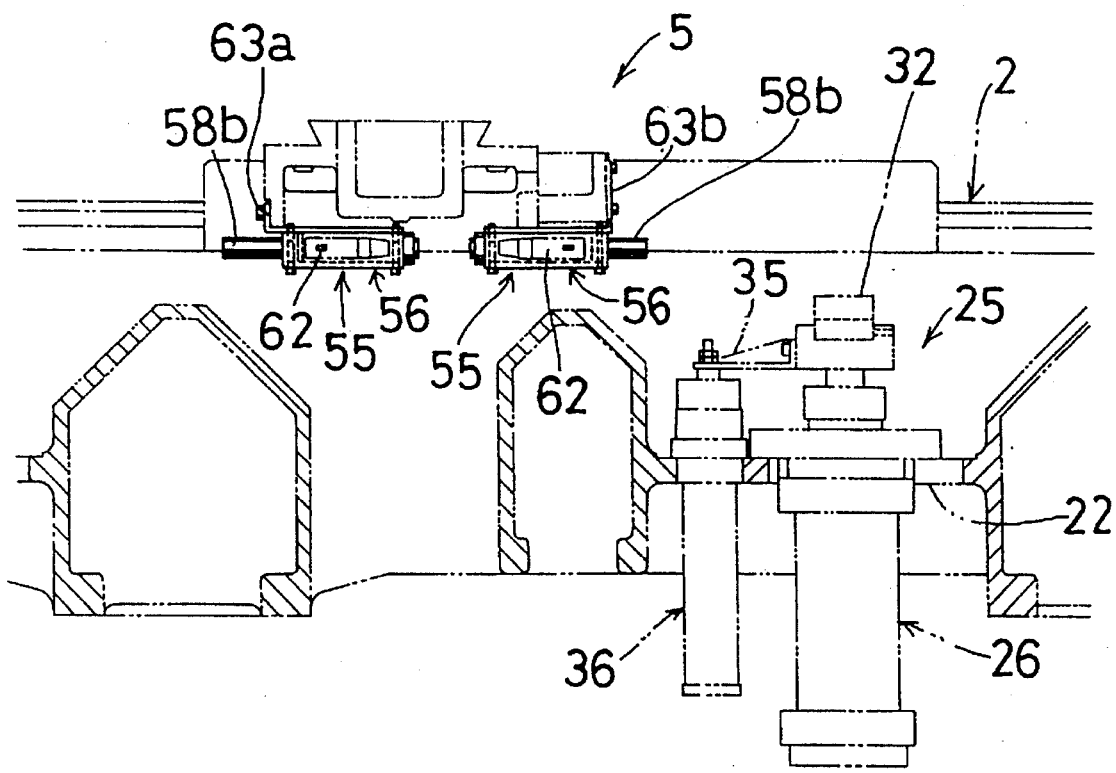
FIG. 11 is a front view of the collision prevention devices, with the lathe partly shown in front view.

As shown in FIG. 11, a pair of collision prevention devices 55 are mounted on the lower portion of the carriage 5 and are positioned on both forward and rearward sides thereof, respectively. The collision prevention devices 55 are operable to prevent collision of the carriage 5 with any of the work rests 25. Such collision may be caused due to mismatching between the speed of movement of the carriage 5 and the timing of the lowering movement of the work rests 25. The collision prevention devices 55 have the same construction. As shown in FIGS. 10 to 13, each of the collision prevention devices 55 includes a box-shaped housing 56 having a substantially square configuration in plan view. The housing 56 includes a pair of side plates 56a and 56b opposed to each other and including inserting holes 57a and 57b formed therethrough, respectively. Each of the inserting holes 57a and 57b has a predetermined diameter for receiving a collision rod 58 which includes an annular recess 59 formed on the central portion thereof so as to divide the collision rod 58 into a rod portion 58a and a rod portion 58b. The rod portion 58a includes an end portion which extends outwardly from the side plate 56a and has a stopper ring 60a mounted thereon. A stopper ring 60b is mounted on the rod portion 58a at a position adjacent the recess 59. A compression coil spring 61 having a predetermined biasing force is interposed between the stopper ring 60b and the side plate 56a, so that the rod portion 58b is kept to normally extend outwardly from the side plate 56b by a predetermined distance. A limit switch 62 is disposed within the housing 56 and has an operational roller 62a which extends into the recess 59.

Figure 12:
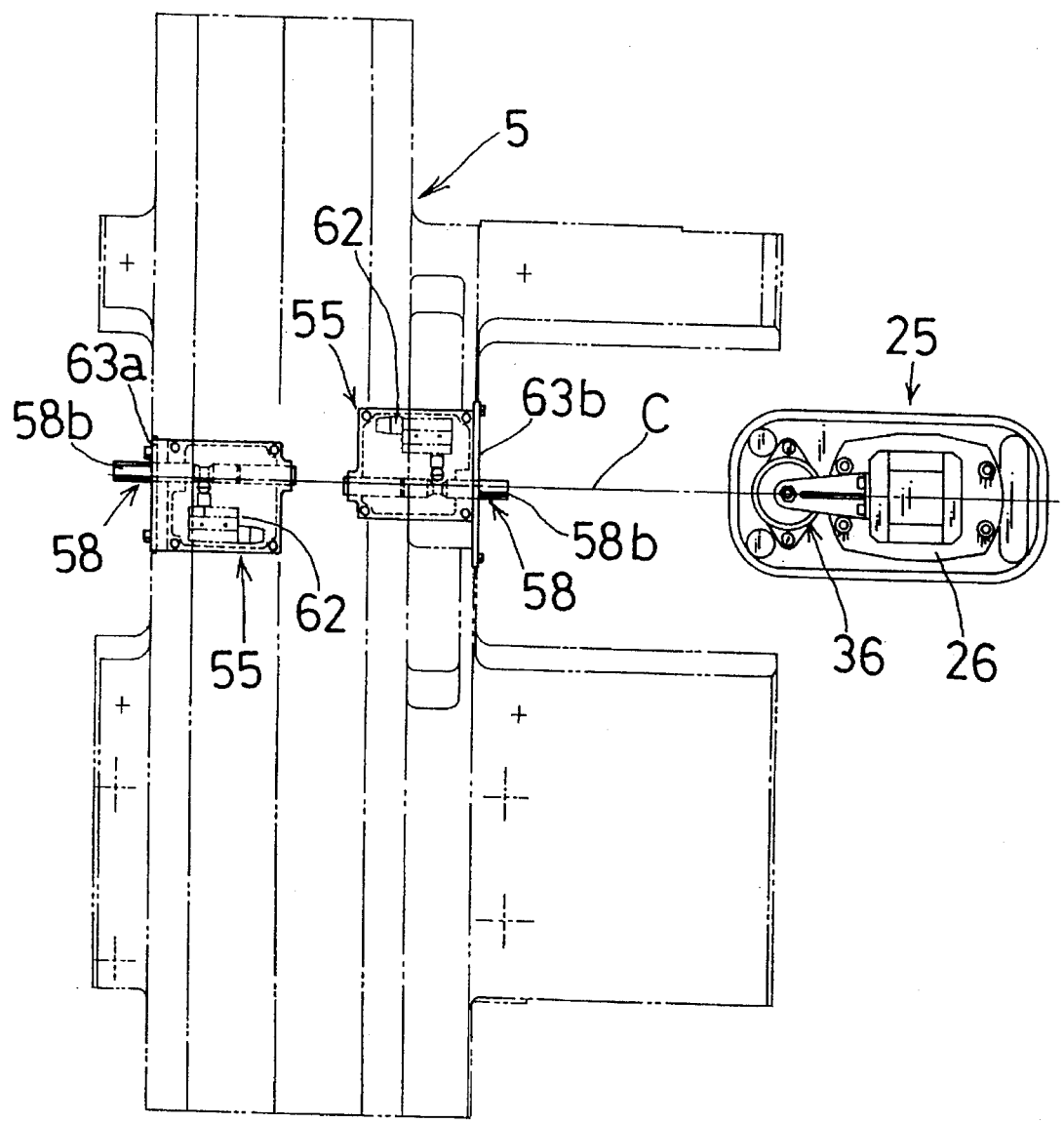
FIG. 12 is a plan view of FIG. 11.
Figure 13:
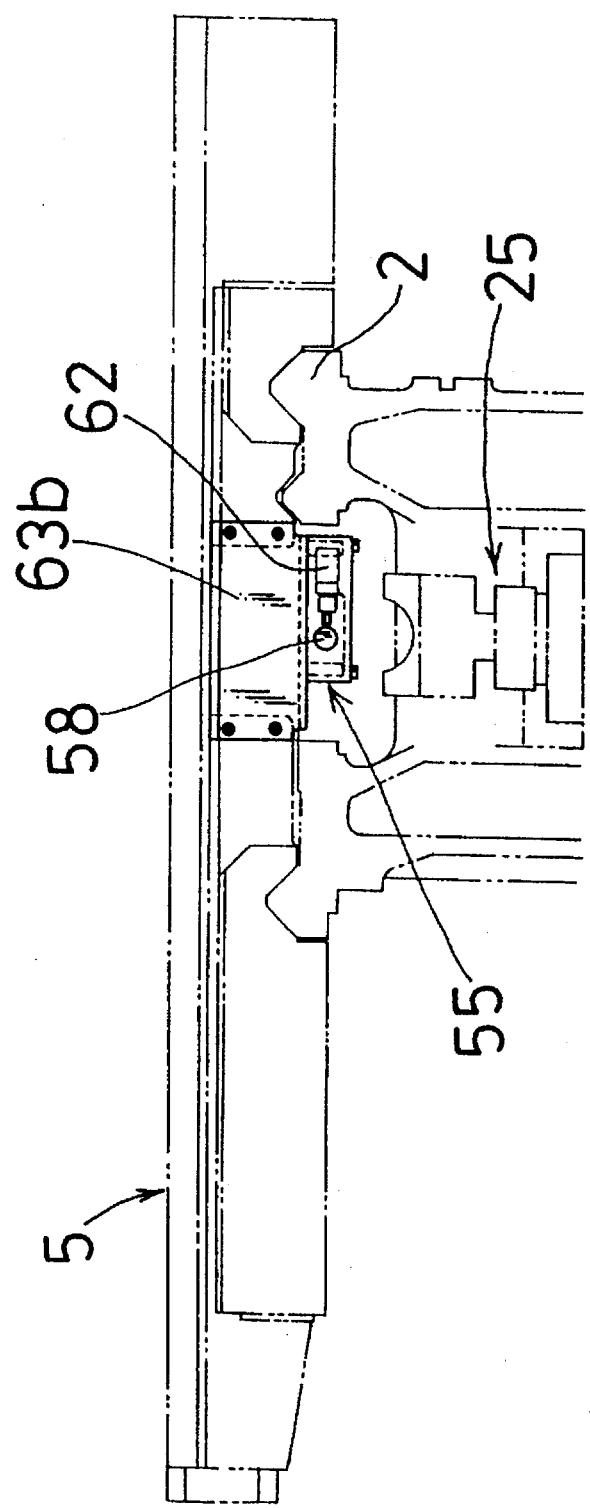
FIG. 13 is a side view of FIG. 11.

As shown in FIGS. 11 and 12, the pair of collision prevention devices 55 are mounted on the carriage 5 by means of mounting brackets 63a and 63b, respectively, and are positioned such that the rod portions 58b of their collision rods 58 extend forwardly and rearwardly from the housings 56, respectively, and that the rod portions 58b are in alignment with each other on the central line C. The rod portions 58b may be displaced from each other by a small distance (in this embodiment, the rod portions 58b are displaced from each other by a small distance). Each of the limit switches 62 of the pair of collision prevention devices 55 is electrically connected to a servo-motor (not shown) for reciprocally moving the carriage 5 through a feeding screw. Thus, when either one of the collision rods 58 of the pair of collision prevention devices 55 collides with any of the work rests 25 due to mismatching between the moving speed of the carriage 5 and the lowering movement of the corresponding work rest 25, the corresponding limit switch 62 is operated through movement of the collision rod 58, so that the servo-motor is stopped to terminate movement of the carriage 5.

Figure 14:
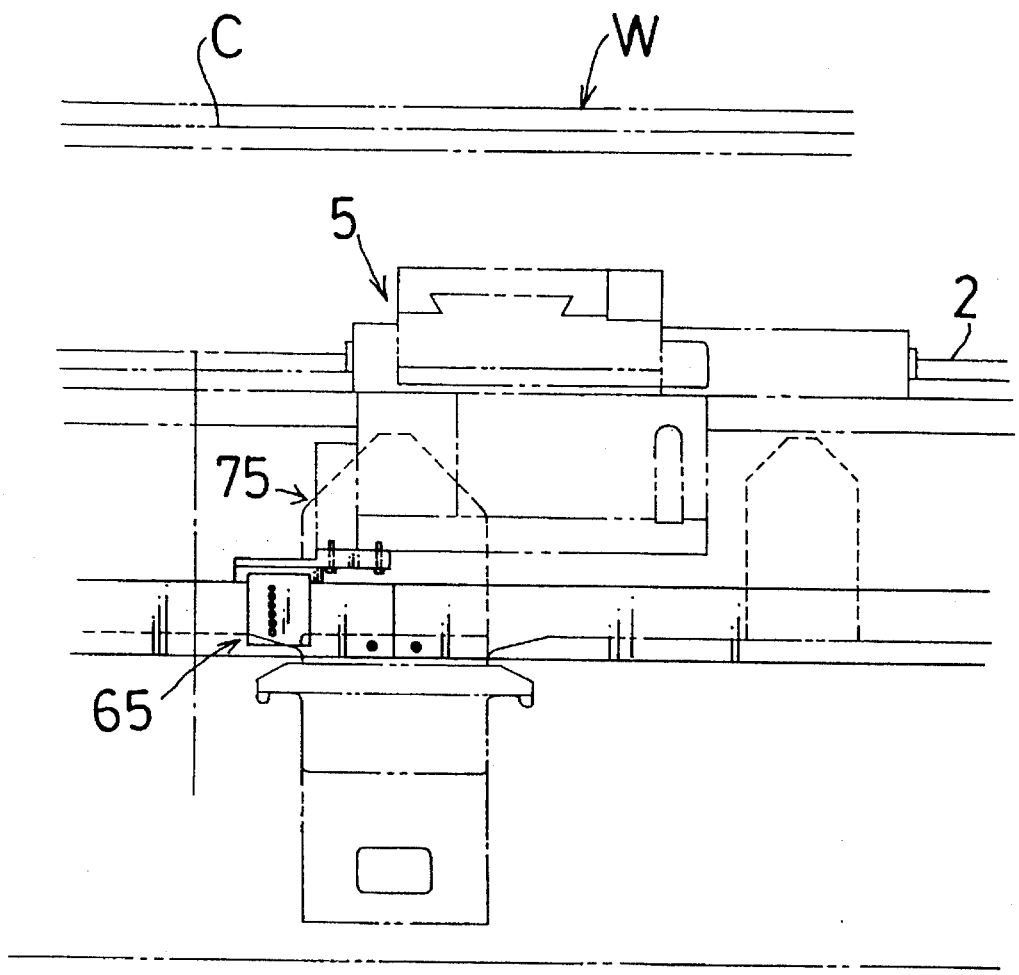
FIG. 14 is a front view of a control device for controlling the operation of the work rests, with the lathe partly shown.
Figure 15:
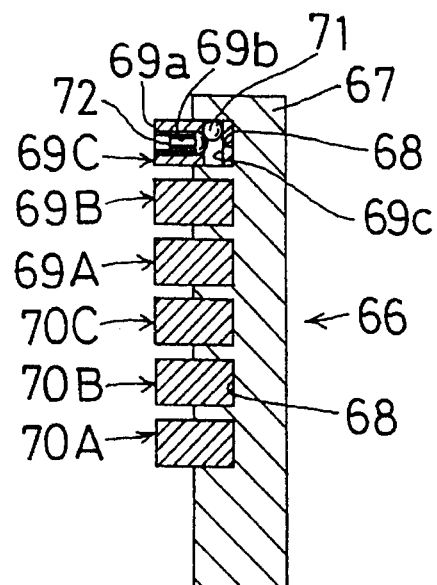
FIG. 15 is a sectional view of dog members mounted on a dog mounting plate of the control device.
Figure 16:
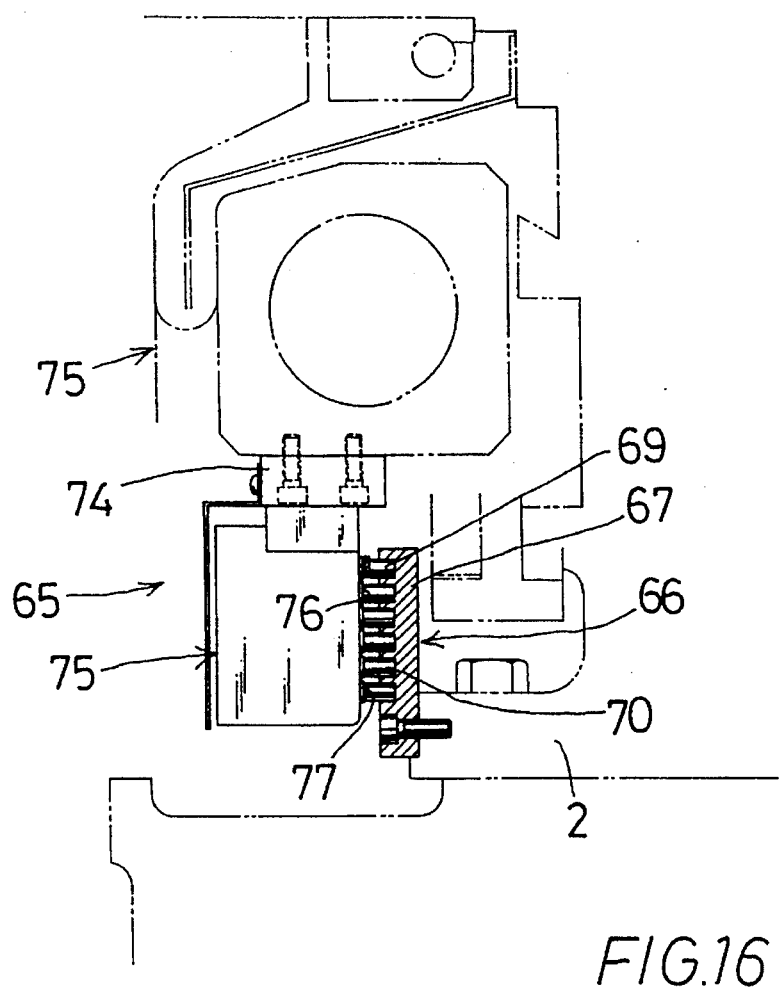
FIG. 16 is a side view of the control device.

As shown in FIG. 14, a work rest control device 65 is provided between the bed 2 and the carriage 5 having the collision prevention devices 55 as described above. The work rest control device 65 serves to control the operation of the work rests 25. As shown in FIG. 16, the control device 65 includes a dog device 66 mounted on the bed 2 and includes a detecting device 75 mounted on an apron 73 (see FIG. 18) of the carriage 5 at a position on the side of the head stock 3. As shown in FIG. 15, the dog device 66 includes a dog mounting plate 67 having a plurality of plate pieces joined together to have a predetermined length. The dog mounting plate 67 includes a plurality of dog mounting recesses 68 formed in parallel with each other in the longitudinal direction of the dog mounting plate 67. In this embodiment, six dog mounting recesses 68 are provided to cope with reciprocal movement of three work rests 25 comprising No. 1 work rest 25A, No. 2 work rest 25B and No. 3 work rest 25C. Plural pairs of dogs 69 and 70 each having a predetermined length are detachably mounted on the dog mounting recesses 68. (In this embodiment, three pairs comprising a pair of +Z No. 1 dog 69A and –Z No. 1 dog 70A, a pair of +Z No. 2 dog 69B and –Z No. 2 dog 70B, and a pair of +Z No. 3 dog 69C and –Z No. 3 dog 70C are provided.) As shown in FIG. 15, the dog 69 as well as the dog 70 has a rectangular configuration in section and protrudes outwardly from the mounting plate 67 when mounted. The dog 69 as well as the dog 70 has a plurality of threaded holes 69b each having a predetermined diameter and extending from a front surface 69a. A through bore 69c is formed in a diametrical direction of each of the threaded holes 69b and is opened toward lateral surfaces of the corresponding dog mounting recess 68 facing to each other. A steel ball 71 having a predetermined diameter is disposed within the bore 69c. Both openings of the bore 69c are narrowed to prevent removal of the steel ball 71 from the bore 69c. A pressing screw 72 is in engagement with each of the threaded holes 69b, so that the steel ball 71 is pressed on one of the lateral surfaces of the corresponding dog mounting recess 68 so as to fix the dog 69 or the dog 70 in position when the pressing screw 72 is driven into the threaded bore 69c.

Figure 17:
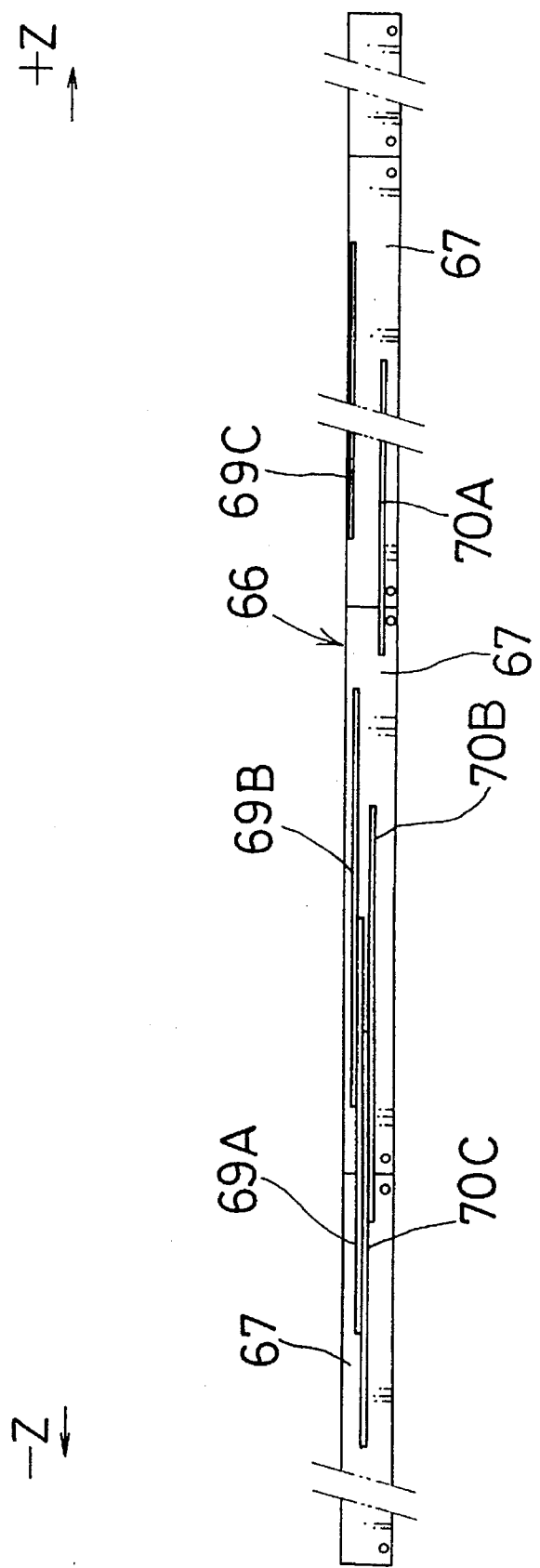
FIG. 17 is a front view of the dog mounting plate showing the mounting pattern of the dog members.

The dog mounting plate 67 having the plural pairs of the dogs 69 and 70 thus fixed in position is mounted on one side of the bed 2. Here, the plural pairs of the dogs 69 and 70 are distributed in a predetermined mounting pattern as shown in FIG. 17. Such a mounting pattern is determined in response to the thread cutting speed of the work (Rotational Speed of Spindle X Feeding Pitch), so that a pattern scale (not shown) is affixed to the dog mounting plate 27 for the lathe 1 or a particular lathe. More specifically, the upper three of the mounting recesses 68 receive +Z No. 1 dog 69A, +Z No. 2 dog 69B and +Z No. 3 dog 69C which are in turn positioned upwardly and which are distributed in a pattern shown in FIG. 17 for controlling No. 1 work rest 25A, No. 2 work rest 25B and No. 3 work rest 25C, respectively, when the carriage 5 is moved in +Z direction. On the other hand, the lower three of the mounting recesses 68 receive –Z No. 1 dog 70A, –Z No. 2 dog 70B and –Z No. 3 dog 70C which are in turn positioned upwardly and which are distributed in a pattern shown in FIG. 17 for controlling No. 3 work rest 25C, No. 2 work rest 25B and No. 1 work rest 25A, respectively, when the carriage 5 is moved in –Z direction. Here, according to the speed of vertical movement of each piston rod 27, the mounting position and the length of each of the dogs 69 and 70 are selectively determined. For example, although in this embodiment, the mounting position and the length of each of the dogs 69 and 70 are determined to cope with the speed of 6 m/min, they should be changed if the speed exceeds 6 m/min.

Figure 18:
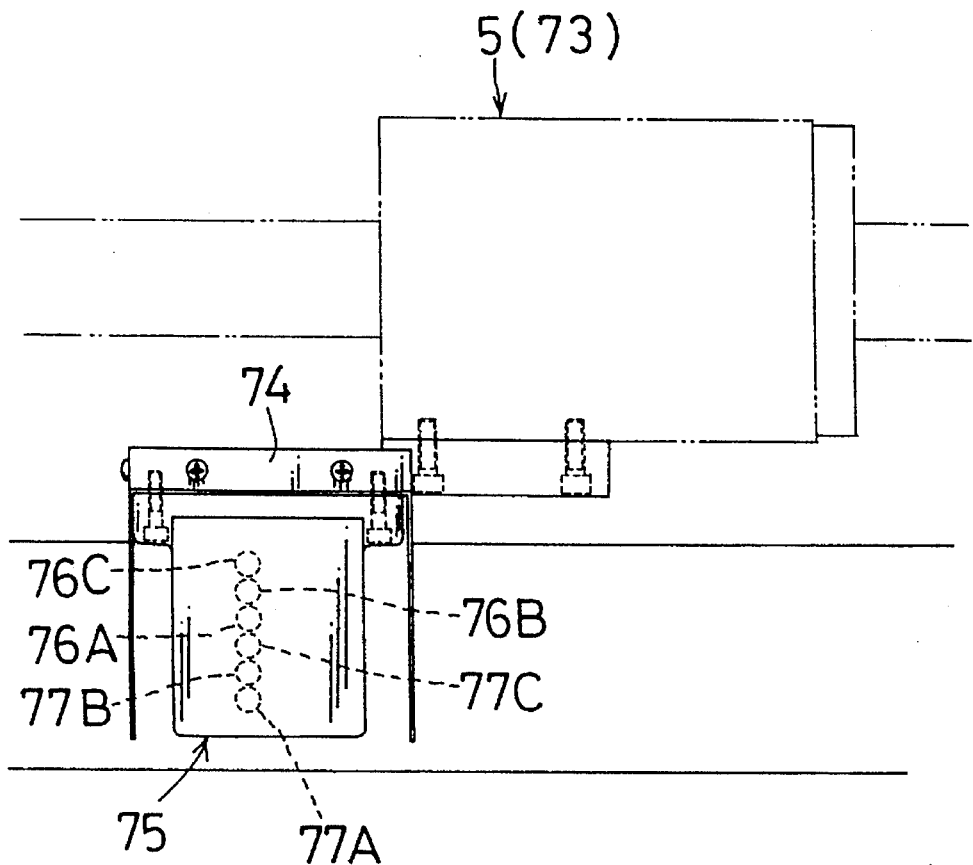
FIG. 18 is a front view of the control device.
Figure 19:
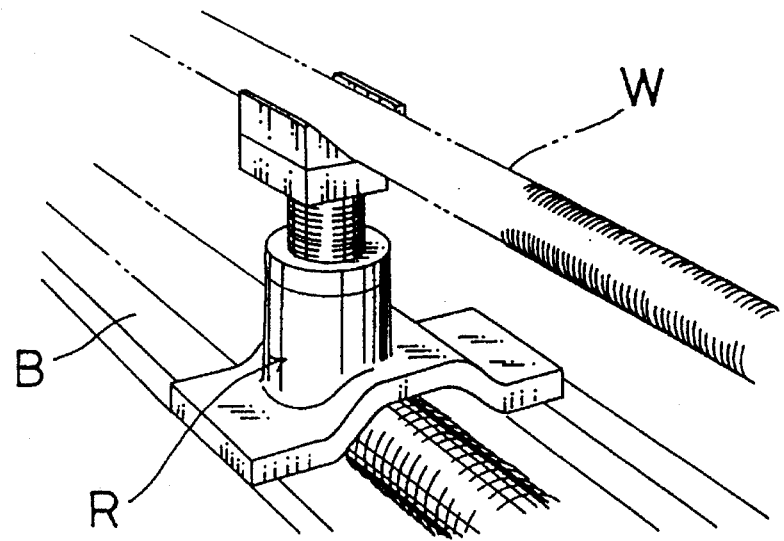
FIG. 19 is a perspective view of a work rest according to the prior art.

As shown in FIG. 18, the detecting device 75 is mounted on the apron 73 of the carriage 5 by means of a bracket 74 and is positioned to confront to the dog device 66. The detecting device 75 has a box-shaped housing and includes therein limit switches 76 and 77 comprising +Z No. 1 limit switch 76A, +Z No. 2 limit switch 76B, +Z No. 3 limit switch 76C, −Z No. 1 limit switch 77A, −Z No. 2 limit switch 77B and −Z No. 3 limit switch 77C which are positioned in series in a vertical direction so as to correspond to +Z No. 1 dog 69A, +Z No. 2 dog 69B, +Z No. 3 dog 69C, −Z No. 1 dog 70A, −Z No. 2 dog 70B and −Z No. 3 dog 70C, respectively. Each of the limit switches 76 and 77 is connected to a programmable sequence controller (not shown) provided in a control panel. When the limit switches 76 and 77 abut on their corresponding dogs 69 and 70 as the carriage 5 moves in +Z or −Z direction, they output signals to the controller so as to control the hydraulic system of the work rests 25 for upward or downward movement of the same.

With the above embodiment thus constructed, the thread cutting operation of the work W is performed according to the following steps:

(1) Mounting the head metal 32 (selected according to the diameter of the work W) on the mounting bracket 28.

(2) Setting the thread cutting speed (Rotational Speed of Spindle X Pitch) on the control panel.

(3) Mounting a cutting tool on the tool box 7 (a cutting tool having a holder is used if necessary).

(4) Mounting the work W to be held between the head stock 3 and the tail stock 4.

(5) Adjusting the positions of the dogs 69 and 70 with reference to the pattern scale in response to the thread cutting speed. (Adjustment of the moving speed of the operational cylinder 26 is performed through adjustment of the magnetic control valve of the hydraulic system if necessary.)

(6) Moving the work rests 25A, 25B and 25C upwardly so as to support the work W by their head metals 32.

(7) Moving the carriage 5 to a position for starting the thread cutting operation.

Here, the position for starting the thread cutting operation for a right hand thread may be on the side of the tail stock 4, while the position for starting the thread cutting operation for a left hand thread may be on the side of the head stock 3. The controller is programmed such that, in case of the thread cutting operation for the right hand thread, −Z No. 1 dog 70A, −Z No. 2 dog 70B and −Z No. 3 dog 70C are operated to cope with a moving speed of the carriage 5 to cut the thread and that +Z No. 1 dog 69A, +Z No. 2 dog 69B and +Z No. 3 dog 70C are operated to cope with a moving speed of the carriage 5 to rapidly return to the starting position. Further, in case of the cutting operation of the right hand thread, −Z No. 1 dog 70A and +No. 1 dog 69A are used to control No. 3 work rest 25C, −Z No. 2 dog 70B and +No. 2 dog 69B to control No. 2 work rest 25B, and −Z No. 3 dog 70C and +No. 3 dog 69C to control No. 1 work rest 25A, respectively. In case of the cutting operation of the left hand thread, the controller is programmed in the opposite manner as the case of the right hand thread.

(8) Setting the rotation prevention device 6 at a position for properly supporting the work W.

(9) Starting the thread cutting operation according to the program through operation of the control panel.

(10) According to the program, as the carriage 5 is moved in −Z direction, moving No. 1 work rest 25C downwardly upon abutment of −Z No. 1 limit switch 77A on −Z No. 1 dog 70A and thereafter moving upwardly upon release of −Z No. 1 limit switch 77A from abutment on −Z No. 1 dog 70A.

(11) Subsequently moving No. 2 work rest 25B and No. 1 work rest 25A downwardly and upwardly in the same manner as No. 3 work rest 25C as the carriage 5 is further moved in −Z direction.

(12) Moving the carriage 5 rapidly to return the starting position in the +Z direction upon completion of a first thread cutting step.

(13) Moving +Z No. 1 work rest 25A downwardly upon abutment of +Z No. 1 limit switch 76A on +Z No. 1 dog 69A and thereafter moving upwardly upon release of +Z No. 1 limit switch 76A from abutment on +Z No. 1 dog 69A as the carriage 5 is moved in +Z direction.

(14) Subsequently moving No. 2 work rest 25B and No. 3 work rest 25C downwardly and upwardly in the same manner as No. 1 work rest 25A as the carriage 5 is further moved in +Z direction to reach its original position so as to complete a first cycle of the thread cutting operation.

(15) Repeatedly performing the above cycle of the cutting operation by predetermined times to complete the thread cutting operation.

The work W is thus cut to form the thread.

As described above, with this embodiment, +Z No. 1 dog 69A, +Z No. 2 dog 69B and +Z No. 3 dog 69C are provided for operation of the work rests 25 when the carriage 5 is moved in +Z direction, and −Z No. 1 dog 70A, −Z No. 2 dog 70B and −Z No. 3 dog 70C are provided for operation of the work rests 25 when the carriage 5 is moved in −Z direction, so that the dogs 69 and the dogs 70 can be appropriately programmed to cope with either the speed for thread cutting or the speed for rapid returning in response to the type of the thread (right-hand thread or the left-hand thread) to be cut in the work W. Thus, the movement of the work rests 25 in the vertical direction can be efficiently performed, so that the working efficiency can be improved. Further, with the provision of the bidirectional rotation prevention device 36 associated with the operational cylinder 26 of each of the work rests 25, the position of the head metal 32 mounted on the operational cylinder 26 can be reliably fixed relative to the work W notwithstanding the vertical movement of the piston rod 27. Additionally, with the provision of the speed reduction device 50 disposed on the lower side of the bidirectional rotation prevention device 36, the impact force applied to the work W can be reduced when the piston rod 27 of the operational cylinder 26 is extended or moved upwardly to support the work W. This may prevent damage applied to the surface of the work W, so that the quality of the product can be improved. The relationship between the movement of the carriage 5 in +Z and −Z directions and the vertical movement of each of the work rests 25 can be adjusted, in the initial set-up operation, through adjustment of the position of each of the dogs 69 and 70 and the amount of flow of the hydraulic fluid supplied to each work rest 25. Even if the lowering movement of any of the work rests 25 has been delayed due to any trouble, the carriage 5 may not collide with such work rest 25 by virtue of the provision of the collision prevention devices 55 mounted on the lower portion of the carriage 5. Each of the collision prevention devices 55 has the collision rod 58 and the limit switch 62. When the collision rod 58 abuts on any of the work rests 25, the limit switch 62 is operated to stop movement of the carriage 5, so that the carriage 5 may not collide with any of the work rests 25.

Although in the above embodiment, three work rests 25 are provided, the number of the work rests 25 can be appropriately determined in response to the whole length of the lathe. Further, among the work rests 25 thus determined, suitable ones may be selected to practically support the work W in response to the length of the work W to be machined. To this end, a switch is provided on the operation panel for selection of the work rests 25 to be practically operated.

While the invention has been described with reference to a preferred embodiment, it is to be understood that modifications or variation may be easily made without departing from the spirit of this invention which is defined by the appended claims.

What is claimed is:

1. A centering device for use with a lathe having a bed, a head stock and a tail stock for holding a work therebetween, a carriage reciprocally movable in a longitudinal direction of the bed, and a tool box having a cutting tool mounted thereon, comprising:

a plurality of work rests disposed along the longitudinal direction of the bed, each of said work rests being movable between a first position for supporting the work and a second position spaced from the work; and control means associated with said work rests for controlling movement of each of said work rests between said first position and said second position in response to the movement of said carriage;

each of said work rests including piston-cylinder means having a piston operable by a pressurized fluid controlled by said control means to be vertically moved between said first position and said second position;

said control means being operable to control the pressurized fluid of said piston in such a manner that an amount of the pressurized fluid is reduced to lower the moving speed of said piston when said piston is moved from said second position to a position adjacent said first position.

2. The centering device as defined in claim 1 wherein said control means includes a dog vertically movable with said piston, a limit switch mounted on said bed and adapted to cooperate with said dog, and a flow control valve disposed in a pressurized fluid circuit for supplying pressurized fluid to said piston, said flow control valve being electrically connected to said limit switch.

3. The centering device as defined in claim 2 further including rotation prevention means for preventing rotation of said piston around its axis, said rotation prevention means including a first shaft connected to said piston in parallel therewith via a bracket and movable with said piston, and a tubular second shaft vertically slidably mounted on said bed and slidably receiving said first shaft, said second shaft having said dog mounted thereon and being vertically movable together with said first shaft when said first shaft has been moved upwardly to exceed a predetermined height, so that said dog is moved with said second shaft to operate said limit switch.

4. The centering device as defined in claim 3 wherein said first shaft includes an upper portion and a lower portion, said upper portion having a diameter smaller than an inner diameter of said second shaft, and said lower portion having a diameter substantially equal to the inner diameter of said second shaft; and wherein said second shaft includes a lid mounted on an upper end thereof and formed with a through hole having a diameter substantially equal to the diameter of said upper portion of said first shaft, so that said upper portion of said first shaft extends through said through hole; whereby said second shaft is moved upwardly together with said first shaft upon abutment of said lower portion of said first shaft on said lid when said first shaft is moved upwardly to exceed said predetermined height.

5. A centering device for use with a lathe having a bed, a head stock and a tail stock for holding a work therebetween, a carriage reciprocally movable by a drive motor in a longitudinal direction of the bed, and a tool box having a cutting tool mounted thereon, comprising:

a plurality of work rests disposed along the longitudinal direction of the bed, each of said work rests being movable between a first position for supporting the work and a second position spaced from the work;

control means associated with said work rests for controlling movement of each of said work rests between said first position and said second position in response to the movement of said carriage; and collision prevention means operable to stop movement of the carriage prior to collision of said carriage with said work rests, said collision prevention means including detection means and switch means;

said detection means being operable to output a detection signal when said carriage is moved to a position within a predetermined distance from each of said work rests;

said switch means being operable to stop said drive motor of said carriage based on said detection signal from said detection means.

6. The centering device as defined in claim 5 wherein a pair of said detecting means and a pair of said switch means are mounted on the carriage on both sides in the moving direction of the carriage.

7. The centering device as defined in claim 6 wherein said detecting means includes a collision bar extending outwardly from the carriage and normally held in an extended position by biasing means; and wherein said switch means includes a limit switch electrically connected to the drive motor and being operable to stop the drive motor when said collision bar is retracted through abutment on any of said work rests.

8. A centering device for use with a lathe having a bed, a head stock and a tail stock for holding a work therebetween, a carriage reciprocally movable in a longitudinal direction of the bed, and a tool box having a cutting tool mounted thereon, comprising:

a plurality of work rests disposed along the longitudinal direction of the bed, each of said work rests being movable between a first position for supporting the work and a second position spaced from the work; and control means associated with said work rests for controlling movement of each of said work rests between said first position and said second position in response to the movement of said carriage;

each of said work rests including piston-cylinder means having a piston operable by a pressurized fluid controlled by said control means to be vertically moved between said first position and said second position;

said control means being operable to control the pressurized fluid of said piston in such a manner that an amount of the pressurized fluid is reduced to lower the moving speed of said piston when said piston is moved from said second position to a position adjacent said first position; and collision prevention means operable to stop movement of the carriage prior to collision of said carriage with said work rests, said collision prevention means including detection means and switch means;

said detection means being operable to output a detection signal when said carriage is moved to a position within a predetermined distance from each of said work rests;

said switch means being operable to stop said drive motor of said carriage based on said detection signal from said detection means.

* * * * *